United States Patent

Sheppard

[11] 3,929,249
[45] Dec. 30, 1975

[54] VACUUM RESERVOIR
[75] Inventor: William L. Sheppard, Romulus, Mich.
[73] Assignee: AVM Corporation, Jamestown, N.Y.
[22] Filed: Apr. 21, 1975
[21] Appl. No.: 570,166

[52] U.S. Cl. .................................. 220/71; 138/172
[51] Int. Cl.² .......................................... B65D 7/42
[58] Field of Search .................. 220/71, 3; 138/172

[56] References Cited
UNITED STATES PATENTS
147,446  2/1874  Stilwell .............................. 138/172
3,141,480  7/1964  Ralston .............................. 138/172

Primary Examiner—William Price
Assistant Examiner—Steven M. Pollard
Attorney, Agent, or Firm—Harness, Dickey & Pierce

[57] ABSTRACT

A conventional tin-plated can adapted for use as a vacuum reservoir by the provision therein of an inlet/outlet passageway and reinforcing means comprising a stressed helical coil spring for placing the central region of the can wall in circumferential tension. A method of making such a reservoir is also disclosed.

18 Claims, 2 Drawing Figures

VACUUM RESERVOIR

BACKGROUND OF THE INVENTION

As is well recognized, there is an increasing use of vacuum powered motors on automotive vehicles, these motors utilizing vacuum created in the engine intake manifold for powering various accessories. As a result of this trend, the vacuum systems in modern automobiles are rather complex, comprising many components, one of which is a vacuum reservoir which acts as an accumulator and a limited reserve source of vacuum when the engine is not operating. Because the reservoirs operate at fairly high vacuum, relatively expensive, substantial reinforcing means are utilized to prevent dangerous implosions which might otherwise occur. The present invention is concerned with the provision of an extremely simple and economical vacuum reservoir for use in these automotive vacuum systems.

The present reservoir is based on the use of a standard tinplated can of standard dimensions (i.e., a two pound coffee can) to which very simple modifications are made. The cost of applicant's reservoir is extremely low because the can is already a highly mass produced item, the tooling for which can be amortized over hundreds of thousands of parts, in addition to those used for the present purpose. The economies herein involved are further enhanced by virtue of the fact that the reservoirs may be sealed using readily available standardized can-closing machines, which are ideally suited for high-volume mass production.

The only modifications made to this standard can, which in the present case is preferably one having three stiffening ribs, are the addition of an inlet/outlet fitting and a simple reinforcing means disposed within the can to make it structurally strong enough to withstand the vacuums normally encountered in the intended environment. The fitting is a very simple mass produced part which may be soldered or otherwise affixed to the can using known techniques and the reinforcing means comprises merely a relatively short helical coil spring, which may be mass produced at relatively low cost on a conventional spring making machine.

The vacuum reservoir of the present invention was conceived for the purpose of complying with the relevantly stringent specifications of one of the automobile manufacturing purchasers of such reservoirs. The specifications is question included:

a. a requirement that the reservoir have a capacity of approximately 140 cubic inches;
b. a requirement that the reservoir withstand 25 inches of mercury vacuum without collapsing;
c. a requirement that the reservoir be sufficiently leak-proof that a vacuum of 20 inches of mercury will not fall below 18 inches of mercury at the end of 24 hours; and
d. a requirement that the reservoir capacity not be reduced by more than 10 per cent of its initial capacity when subjected to a static load of 100 pounds for one minute, wherein the contact surface of the load is a flat square surface two inches by two inches, the load is applied against the side of the reservoir at the center thereof, and the reservoir has an initial vacuum of 24 inches of mercury.

Compliance with these strict specifications was achieved by applicant with a reservoir constructed in accordance with the present invention using an inexpensive, standard three-ribbed 502 × 610 tin-plated can and a short helical coil spring. Attempts by others to meet these specifications have resulted in relatively expensive specially fabricated tanks which are provided with substantial reinforcement in order to avoid the dangerous implosions which would otherwise occur at the relatively high vacuums encountered.

In addition to the economies achieved by the present invention, another feature of the invention concerns the use of the standard stiffening ribs in a tin-plated can for locating reinforcing means, as well as the provision of a reservoir which will safely handle the relatively high vacuums encountered. The invention also concerns an improved method of making a vacuum reservoir.

A preliminary patentability search by applicant turned up the following U.S. Pat. Nos.: 123,269; 654,405; 884,450; 2,039,095; 2,164,660; 2,269,617; 3,025,992; and 3,252,610. None of these patents suggest applicant's invention disclosed herein.

DESCRIPTION OF THE PREFERRED EMBODIMENTS

Figure 1:
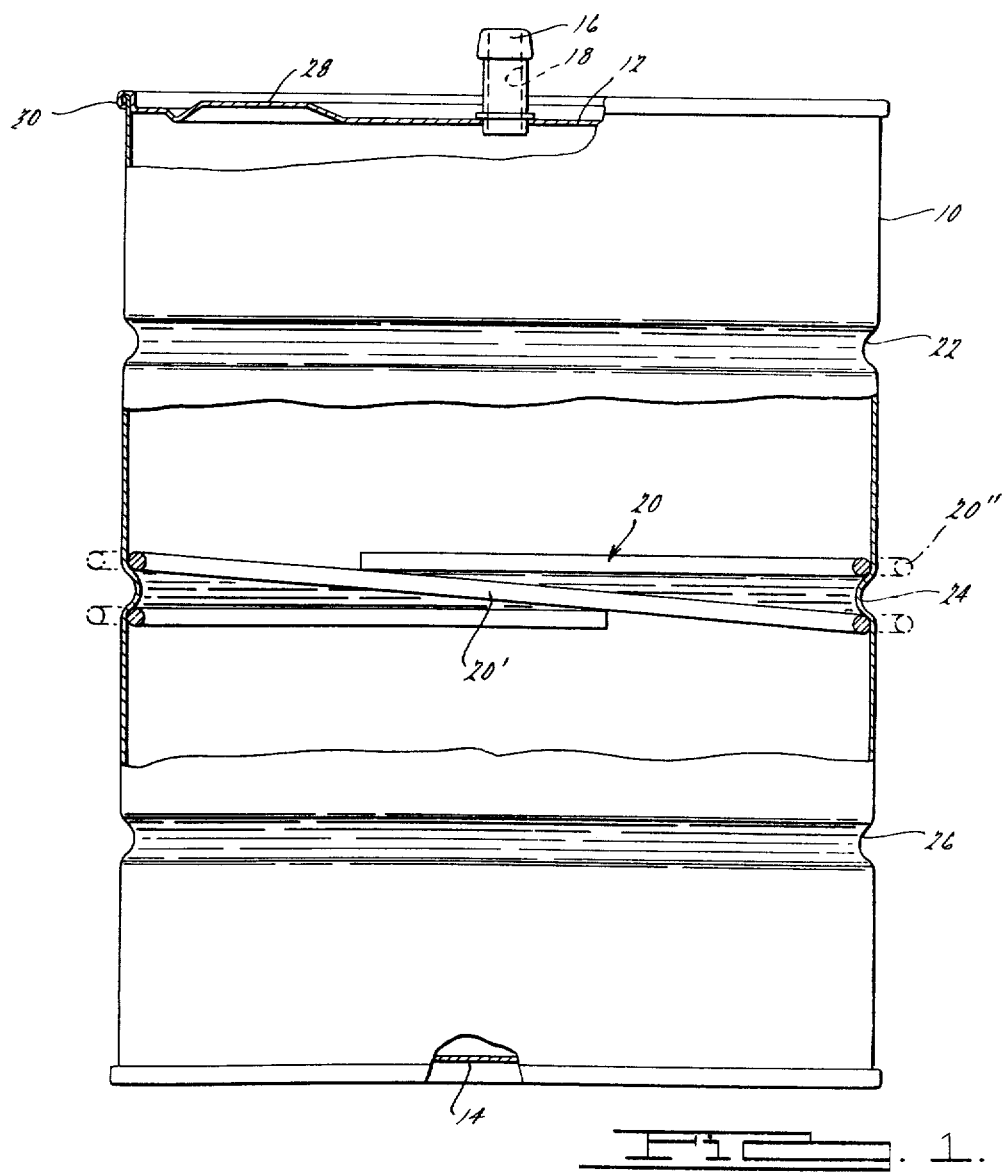
FIG. 1 is a side-elevational view, partially in section, illustrating a vacuum reservoir embodying the principles of the present invention.

The vacuum reservoir of the present invention is extremely simple in construction. As best seen in FIG. 1, it generally comprises a cylindrical sheet metal body member 10 having circular end walls 12 and 14 sealingly closing each end of the body member. End wall 12 is provided with a nipple 16 of conventional hose-connecting configuration, having a passageway 18 passing therethrough for communicating fluid (i.e., air) into and out of the reservoir defined by the body member and end walls. Disposed within the reservoir is a reinforcing means comprising a relatively short helical coil spring 20, preferably located centrally of the reservoir and in a plane lying generally transverse to the longitudinal axis of the body member. Spring 20 is in a stressed condition so that it will create a continuous outward bias on substantially a full circumference of the wall of the reservoir. It is believed that spring 20 places the central portion of body member 10 in circumferential tension, the resulting prestress increasing the capacity of the reservior to accommodate relatively high vacuums without deflecting or collapsing.

As is readily apparent from the drawings, body member 10 and end walls 12 and 14 constitute a standard two-pound coffee can, a mass produced inexpensive can which in the trade in referred to as a 502 × 610 tin-plated can. The numbers refer to the size (i.e., 5-2/16 by 6-10/16 inches), however it will be appreciated that different sizes may be used, depending on the capacity and vacuums contemplated. As is conventional with such cans, there are provided three similar stiffening ribs 22, 24 and 26 which are substantially equally spaced along the longitudinal extent of the can, with rib 24 being disposed generally in the center region of the can. Each of the stiffening ribs extends for a full circumference around the outer periphery of body member 10 and is in the form of a generally inwardly directed ridge formed integrally in the body member wall. In addition, end members 12 and 14 are each provided with the usual generally annular reinforcing rib 28 to increase the stiffness thereof. End walls 12 and 14 are identical to one another in configuration, except for the provision of nipple 16 on end wall 12, and therefore only the configuration of end wall 12 is illustrated.

The particular tin-plated can in question, when constructed in accordance with the present invention so as to have a capability of meeting the aforementioned specifications for a vacuum reservoir, is formed with tin-plated sides having an 85 pound base weight and tin-plated ends having a 95 pound base weight. The body member has a conventional soldered side seam (not shown) and end walls 12 and 14 are secured to the body member by a double seam connection, indicated generally at 30. This technique for affixing the ends to the can is entirely conventional and is performed using a standard can making machine.

Nipple 16, which may be formed of metal by die casting, may be affixed to end wall 12 in any suitable manner, such as by soldering or by using a suitable adhesive.

Figure 2:
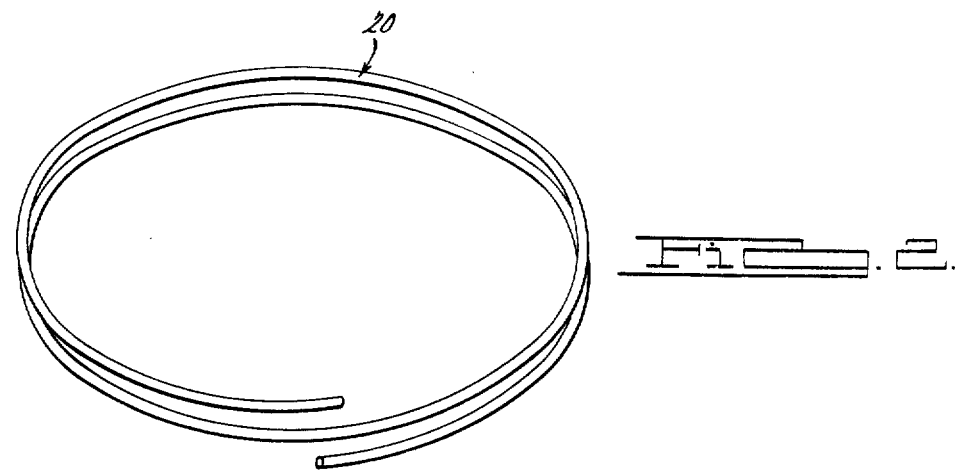
FIG. 2 is a perspective view of the reinforcing means utilized in the vacuum reservoir of the present invention, shown in an unstressed state prior to assembly.

Spring 20, which is illustrated in FIG. 2 in its unstressed condition prior to assembly, comprises approximately two full coils of a helical coil spring, preferably formed of steel. Applicant has discovered that such a spring formed of zinc-plated hard drawn steel of a diameter of 0.120 inches, a pitch of 0.25 inches and formed with an unstressed O.D. of approximately 5.60 inches, will, when inserted in a two pound coffee can in the manner illustrated, provide a vacuum reservoir fully capable of meeting the aforesaid specifications.

One of the unique aspects of the present invention is the manner in which spring 20 is retained in place in the reservoir. As best seen in FIG. 1, the spring is so positioned that substantially one full coil thereof is disposed on each side of rib 24, i.e., the spring straddles the rib. As a consequence, the spring is held in place not only by virtue of its stress-induced frictional engagement with the side walls of the body member, but also by virtue of its mechanical engagement with stiffening rib 24; that is, there is mechanical interference created by the stiffening rib which mechanically impeads movement of the spring in a longitudinal direction with respect to the body member. Because the rib 24 projects inwardly from the inner surface of the can, the center portion of the spring, indicated at 20', will necessarily be spaced from a portion of the can wall where it crosses over the rib, however this has not been found to adversely effect the adequacy of the reinforcement provided or retention of the spring.

The unstressed dimensions of spring 20 are illustrated in phantom lines at 20" in FIG. 1, and in assembly the spring is stressed by pulling the ends thereof past one another to reduce the overall diameter thereof, and then inserting it within the can prior to the assembly thereto of end wall 12. When the spring 20 is in the appropriate position, the inserting fixture is released to permit the spring to expand to the position illustrated, which as can be seen is still less than what it would normally expand to if it was not in the can. End wall 12, with the nipple affixed thereto, is thereafter double seamed to the can to complete the assembly. The spring is preferably of such a length that upon assembly, there is at least a slight overlap of the ends thereof with respect to each other, as illustrated in FIG. 1.

Although the above dimensions were found to give very satisfactory results, it is believed that other helical coil spring configurations will also give satisfactory results. Generally speaking, the spring wire should be of as small a diameter as possible so that it can be easily collapsed for assembly without exceeding its yield point, and yet should have sufficient strength that it will provide an adequate outward bias for tensioning of the body member to render it capable of handling the vacuums to be encountered. Upon assembly, the spring should of course be stressed less than its yield point for the temperature of the environment contemplated. Pretempered steel spring wire is believed to be the preferable material for this application. A minimum number of coils is also preferable in order to reduce the amount of material and hence cost involved, however at least two coils should be utilized in order to be able to use the central stiffening rib for locating purposes.

If desired, the spring 20 may be formed so that each end has a radially inwardly extending portion, to thereby facilitate handling and assembly, though at a slight increase in cost. In addition, if in a particular environment it is discovered that the spring requires additional retention means to retain it in place, it may be easily tacksoldered to the can, the latter being tin-plated to thus facilitate the adhesion of solder.

Thus, there is disclosed in the above description and in the drawings several embodiments of the invention which fully and effectively accomplish the objects thereof. However, it will be apparent that variations may be indulged in without departing from the sphere of the invention herein described or the scope of the appended claims.

What is claimed is:

1. A vacuum reservoir comprising: a generally cylindrical longitudinally extending sheet metal body member having a plurality of circumferentially extending radially inwardly projecting ridges formed therein, one of said ridges being disposed in the vicinity of the longitudinal center of said body member; end members sealingly closing the ends of said body member to define a fully enclosed reservoir; inlet passage means in one of said end members for communicating fluid into and out of said reservoir; a helical coil spring having a plurality of coils and being disposed within said body member, the entirety of said spring being disposed in the vicinity of said one of said ridges with at least one coil on each side thereof, said spring being in a stressed state to thereby exert a radially outward bias on said body member for substantially the full circumferential extent of said spring, whereby said body member is placed in circumferential tension in the vicinity of said spring, said spring being maintained in position solely by frictional engagement with said body member and mechanical engagement with said one of said ridges.

2. A vacuum reservoir comprising: a body member having a circumferentially extending ridge formed therein; end members sealingly closing the ends of said body member to define a fully enclosed reservoir; inlet passage means for communicating fluid into and out of said reservoir; a spring disposed within said body member, and being in a stressed state to exert a radially outward bias on said body member, said spring being maintained in position solely by frictional engagement with said body member and mechanical engagement with said ridge.

3. A vacuum reservoir as claimed in claim 2 wherein said spring is a helical coil spring.

4. A vacuum reservoir as claimed in claim 3 wherein said spring comprises at least two full coils.

5. A vacuum reservoir as claimed in claim 4 wherein adjacent coils of said spring straddle said ridge.

6. A vacuum reservoir as claimed in claim 2 wherein said spring is disposed wholly in the vicinity of the center of said body member, with the ends of said spring substantially spaced from said end members.

7. A vacuum reservoir comprising: a body member; end members sealingly closing the ends of said body member to define a fully enclosed reservoir; inlet passage means for communicating fluid into and out of said reservoir; a helical coil spring having a plurality of coils and being disposed within said body member, said spring being in a stressed state to thereby exert a radially outward bias on said body member for substantially the full circumferential extent of said spring.

8. A vacuum reservoir as claimed in claim 7 wherein said spring is disposed wholly in the vicinity of the center of said body member.

9. A vacuum reservoir as claimed in claim 7 wherein said spring comprises at least two full coils.

10. A vacuum reservoir as claimed in claim 9 wherein adjacent coils are spaced from one another.

11. A vacuum reservoir as claimed in claim 10 wherein the ends of said spring are spaced a substantial distance from said end members.

12. A vacuum reservoir as claimed in claim 7 wherein said spring comprises slightly more than two full coils in said stressed state.

13. A vacuum reservoir comprising: a body member having a circumferentially extending radially inwardly projecting ridge formed therein; end members sealingly closing the ends of said body member to define a fully enclosed reservoir; inlet passage means for communicating fluid into and out of said reservoir; a helical coil spring having a plurality of coils and being disposed within said body member, said spring being disposed in the vicinity of said one of said ridges with at least one coil on each side thereof, said spring being in a stressed state to thereby exert a radially outward bias on said body member.

14. A vacuum reservoir as claimed in claim 13 wherein said ridge is formed in the vicinity of the center of said body member.

15. The method of making a vacuum reservoir, comprising the steps of: providing an open-topped conventional tin-plated can; compressing a relatively short helical coil spring having an unstressed diameter greater than the inside diameter of said can, to a size in which its outside diameter is less than the inside diameter of said can; inserting said compressed spring into said can; releasing said spring to permit it to expand into engagement with the inside walls of said can; sealing a lid to the open top of said can; and providing passage means for communicating fluid into and out of said can.

16. The method as claimed in claim 15 wherein said passage means is affixed to said lid prior to the latter being sealed to said can.

17. The method as claimed in claim 15 wherein said lid is double seamed to said can.

18. The method as claimed in claim 15 wherein said can has at least one stiffening rib therein and said spring is released in the vicinity thereof so that said spring straddles said rib.

* * * * *